United States Patent
Bayrle et al.

(10) Patent No.: US 6,762,808 B2
(45) Date of Patent: Jul. 13, 2004

(54) LCD-CELL WITH COLOR AND LIGHT FILTERING LAYERS

(75) Inventors: Reiner Bayrle, Langenau (DE); Otto Bader, Warthausen (DE); Thomas Bitter, Bad Ditzenbach (DE)

(73) Assignee: AEG Gesellschaft fur moderne informationsysteme mbH, Ulm (DE)

( * ) Notice: Subject to any disclaimer, the term of this patent is extended or adjusted under 35 U.S.C. 154(b) by 0 days.

(21) Appl. No.: 10/156,740

(22) Filed: May 28, 2002

(65) Prior Publication Data

US 2003/0016319 A1 Jan. 23, 2003

(30) Foreign Application Priority Data

May 25, 2001 (DE) .......................................... 101 25 673

(51) Int. Cl.[7] ..................... G02F 1/1335; G02F 1/1347; G02F 1/1333
(52) U.S. Cl. .......................... 349/106; 349/74; 349/110; 349/113
(58) Field of Search ................................ 349/106, 110, 349/111, 153, 113, 114, 74

(56) References Cited

U.S. PATENT DOCUMENTS

| | | | |
|---|---|---|---|
| 4,824,215 A | | 4/1989 | Joseph et al. |
| 4,832,457 A | | 5/1989 | Saitoh et al. |
| 5,056,893 A | | 10/1991 | Holz et al. |
| 5,661,531 A | * | 8/1997 | Greene et al. ............... 349/73 |
| 6,061,109 A | * | 5/2000 | Suginoya et al. ........... 349/106 |
| 2002/0026734 A1 | | 3/2002 | Bayrle et al. |

FOREIGN PATENT DOCUMENTS

| | | |
|---|---|---|
| DE | 3633708 A1 | 4/1988 |
| DE | 3837313 A1 | 5/1989 |
| DE | 4203276 A1 | 4/1993 |
| DE | 4209072 A1 | 9/1993 |
| DE | 4244584 A1 | 7/1994 |
| DE | 19653288 A1 | 6/1998 |
| DE | 19654440 A1 | 7/1998 |
| DE | 19710855 A1 | 10/1998 |
| DE | 19950839 A1 | 5/2001 |
| EP | 0735402 | 10/1996 |
| FR | 2713812 A1 | 6/1995 |
| JP | 04212929 | 8/1992 |
| JP | 08015708 | 1/1996 |
| JP | 08304832 | 11/1996 |
| JP | 09160016 | 6/1997 |
| JP | 11073127 | 3/1999 |

OTHER PUBLICATIONS

U.S. patent application Publication 2002/0026734, equivalent for DE–OS 100 23 378.3 A 1.

English language abstract for DE 3633708 A 1 from esp@cenet.com.

(List continued on next page.)

*Primary Examiner*—Tarifur R. Chowdhury
(74) *Attorney, Agent, or Firm*—Dority & Manning, P.A.

(57) ABSTRACT

A liquid crystal display (LCD) cell is provided having transparent plates that are substantially parallel to each other and contain a liquid crystal display material. A plurality of spacers are interposed between the transparent plates to define a distance between the plates. At least one of the spacers exhibits dimensions and properties different than another of the spacers. The different dimensions and properties operate to control the distance at various temperatures to prevent non-uniform color effects and vacuum void formations.

26 Claims, 1 Drawing Sheet

OTHER PUBLICATIONS

English language abstract for DE 3837313 A 1 from esp@cenet.com.

Japanese Patent Abstract, Application No. 02400745, Application Date Jul. 12, 1990, Publication No. 04212929, Publication Date Aug. 4, 1992, European Patent Office.

English language abstract for DE 4203276 A 1 from esp@cenet.com.

English language abstract for DE 42 09 072 A 1 from esp@cenet.com.

English language abstract for DE 4244584 A 1 from esp@cenet.com.

Japenese Patent Abstract, Application No. 07316914, Application Date May 12, 1995, Publication No. 09160016, Publication Date Jun. 20, 1997, European Patent Office.

English language abstract for FR 2713812 A 1 from esp@cenet.com.

English language abstract for DE 19653288 A 1 from esp@cenet.com.

English language abstract for DE 19654440 A 1 from esp@cenet.com.

English language abstract for DE 19710855 A 1 from esp@cenet.com.

Japanese Patent Abstract, Application No. 10112580, Application Date Apr. 23, 1998, Publication No. 11073127 A, Publication Date Mar. 16, 1999.

English language abstract for DE 19950839 A 1 from esp@cenet.com.

* cited by examiner

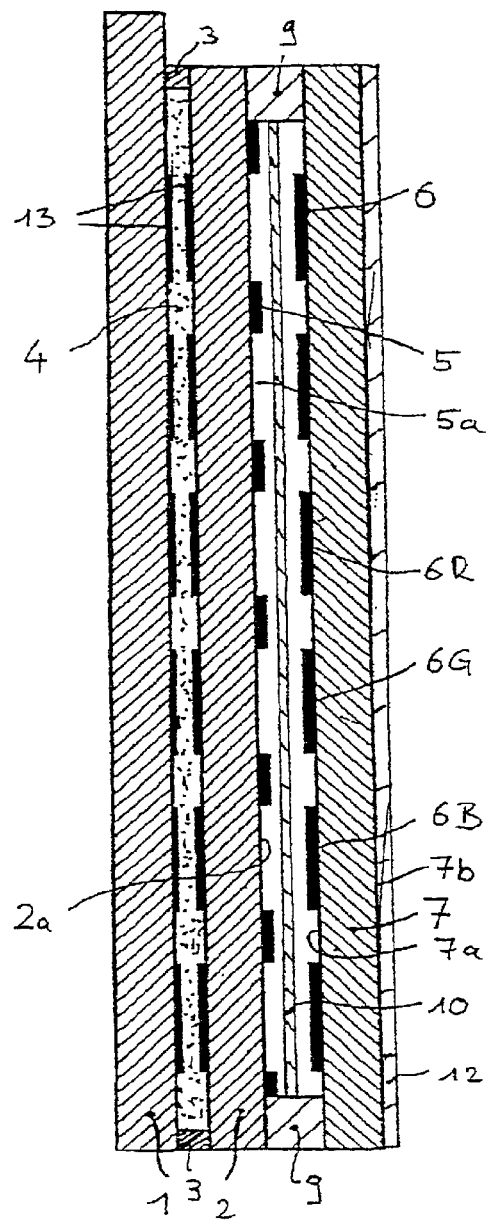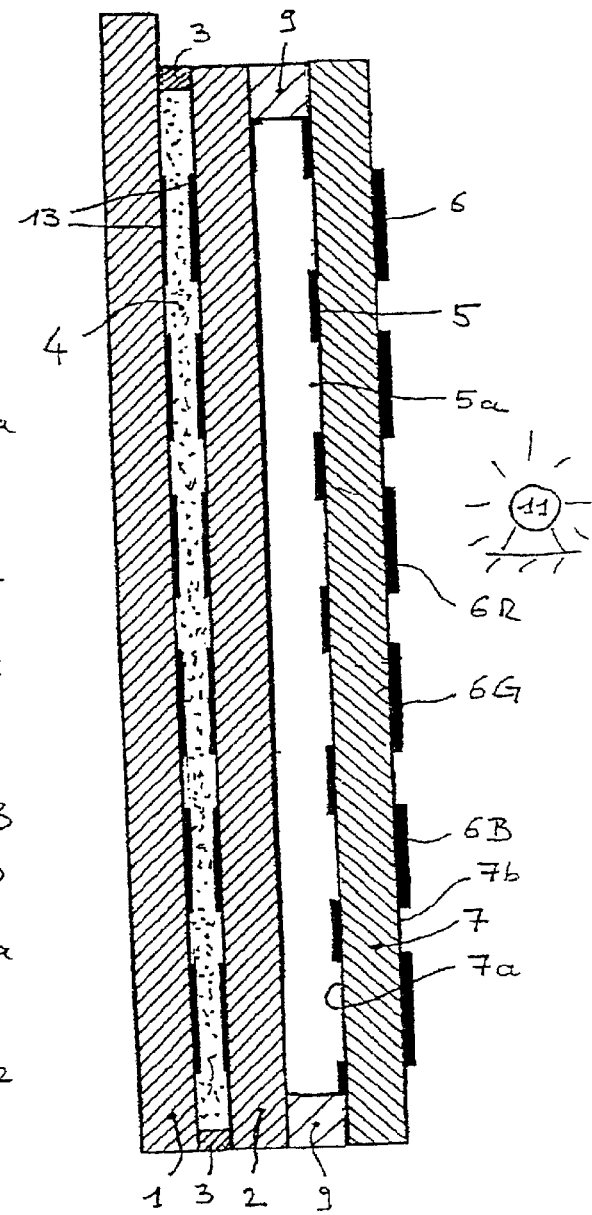

LCD-CELL WITH COLOR AND LIGHT FILTERING LAYERS

FIELD OF THE INVENTION

The invention concerns a cell in a chromatic liquid crystal display (hereinafter an "LCD").

BACKGROUND OF THE INVENTION

A known cell in a chromatic LCD-display, for instance, from SHARP®, includes two parallel plates, arranged behind one another, between which a liquid crystal is to be found. For each individual image element of the display, one electrode is installed per pair of plates. Upon the application of a potential between the electrodes, the liquid crystal therebetween, first impervious to polarized light, becomes transparent for polarized light, which is known as a "normally-black-mode LCD", so that the image element appears bright or dark, upon being illuminated from the one surface, for example by a light source or by a layer which reflects incident light.

In the case of color-LCD's, in accord with the state of the technology, there is on one of the two plates (i.e. the first plate) a color filtering layer on the side facing the liquid crystal (inner surface). This surface has the contour of the image element, so that the illuminated image element as seen from outside appears as colored. Advantageously, in this arrangement, every three neighboring image elements are combined with color filters of primary colors into one image point.

Between the color filters of the individual image elements on the inner surface of the first plate an opaque layer (black mask) is placed which completely fills the intervening space between the color filters of the individual image elements. On the one hand, this black mask sharply delimits the individual image elements and so increases the contrast of the entire image. On another hand, the black mask obstructs, upon the control of an image element, the illumination of neighboring elements by random light, which would lead to a falsification of the color.

The color filter and the black mask are normally brought upon the first plate by something like a flex-o-pressure procedure or by photolithography, whereby one after the other, for instance, first all red, then all green, and then all blue color filters and finally, the black mask is laid down. When this is done, the black mask must be placed on the small pixel sizes on the inner surface of the first plate, in order to avoid or limit undesired parallax effects, or to hold as much as possible.

In the case of an LCD-cell of the state of the technology, further disadvantages arise. First, all color filters as well as the black masks must be installed with great precision, have exactly defined contours and be placed in specifically designated areas, since each of them have common delimiting surfaces. This brings about very expensive procedures for manufacturing in clean-room conditions as well as optical quality penalties as a result of manufacturing tolerances. Second, both the color filters as well as the black mask material which are used must be of the highest quality material, since both are separated from the liquid crystal by a thin polyamide layer and otherwise impurities would easily migrate into the liquid crystal by ion diffusion.

BRIEF SUMMARY OF THE INVENTION

The invention provides an LCD-cell for colored liquid crystal displays, which has low sensitivity in regard to the precision of the color filter.

An LCD-cell for a color liquid crystal, in accord with the present invention, comprises a first transparent plate, a transparent second plate arranged parallel to and behind the first plate, a liquid crystal placed between the first and the second plate, at least one color filtering layer of at least a material that transmits specifically light of a definite wave length, and a light impervious layer of light blocking material, which advantageously could also be an opaque material, which possesses openings, whereby the opaque layer and the color filtering layer are placed in planes, essentially parallel to the first and the second plates and outside of the liquid crystal.

By the decoupling of the color filtering and the opaque layer, an LCD-cell in accord with the invention exhibits a number of advantages:

the color filter need not possess the precision of the contour of the current components, that is, be precise as to the placement of the current image element, since this is already sharply deliminated by the black mask. On this account, the color filters can, for example, be installed with a greater manufacturing tolerance and thereby more economical on one or more surfaces, the color filtering layer does not require any extraordinary purity and/or resistivity to other materials, particularly in regard to liquid crystals, since they no longer come into contact with the liquid crystal, since the black mask is installed fundamentally alone and upon another surface than the color filter, the black mask can be very precisely installed, in the case of damage, or for the changing of the colors of the display, principally, the corresponding plane can be exchanged, due to the defining surface between the color filtering layer and the air, the reflexivity of the color filter increases excellently, and the display appears brighter because of the more strongly changing refractory index.

In a first embodiment of the invention, the LCD-cell includes further a parallel third, transparent plate behind the second plate, whereby the color filtering layer is placed on a surface of this third plate and the opaque layer is placed on another surface lying opposite to this surface.

In a second embodiment of the invention, the LCD-cell possesses likewise a third, transparent plate situated behind the second plate, whereby the color filtering layer is placed on a surface of this third plate and the opaque layer is located on a surface of the second plate which is remote from the liquid crystal.

In an advantageous embodiment of the invention, the openings of the opaque layer are so dimensioned and disposed that they sharply delimit each component to a definite shape, something like a pixel or a segment of an alpha numeric character set, so that the individual components are defined in outline not only by the controlling electrodes, but more exactly by the black mask.

In a further advantageous version of the invention, the color filtering layer possesses various areas of differing materials, which normally allow light of a definite color to pass through, preferably in the colors of red, green and blue. Similarly, in a further advantageous embodiment each color area respectively possesses at least a surface of an opening of the opaque layer and is so arranged, that it covers over this opening in the vision line of the liquid crystal. Thus, varied colored image elements are available, whereby, advantageously, respectively three neighboring image elements exhibit the primary colors.

In a further advantageous embodiment of the invention, spacers are placed between the second plate and the third plate. Behind the second plate for example, in the hollow space so created, is a film for the improvement of the optical characteristics. Such a film is called an "enhancement film". This film improves, to a certain extent, the luminance of the light, the directional properties thereof, and/or the saturation of the color.

In a further advantageous rendering of the invention, an illumination source is placed behind the second or the third plate and/or an at least partially reflecting layer is placed, which reflects, or allows light to shine in the line of vision of the liquid crystal display.

Finally, a plurality of color filtering layers, advantageously of different materials can be placed in essentially parallel planes, which advantageously only give passage to light of respectively predetermined wave lengths.

BRIEF DESCRIPTION OF THE DRAWINGS

The above and other aspects, features and embodiments of the present invention are apparent from the detailed description below in combination with the drawings in which:

FIG. 1 is a cross-section of an LCD-cell in accord with a first embodiment of the invention; and FIG. 2 is a cross section of an LCD-cell in accord with a second embodiment of the invention.

DETAILED DESCRIPTION OF THE PREFERRED EMBODIMENTS

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. Thus, the present invention includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

In FIG. 1, an LCD-cell includes, according to one aspect of the present invention, a first transparent plate 1, a second transparent plate 2 behind and parallel to plate 1, a sealing apparatus 3 between the first plate 1 and the second plate 2, the sealing apparatus 3 disposed on the periphery of the second plate 2, a liquid crystal 4 between the first plate 1 and the second plate 2, a third transparent plate 7 disposed behind the second plate 2 and parallel thereto, a color filtering layer 6, made of materials which permit passage of light of a defined wavelength and which is located on a surface 7a of the third plate 7, and a layer 5 which allows passage of light from a light-blocking, advantageously opaque material which has openings 5a and which is placed on a surface 2a of the second plate 2.

The openings 5a of the opaque layer 5 are so dimensioned and placed that they respectively delimit the image elements of a definite form.

For each image element, electrodes 13 are on the surfaces of the first and second plate 1, 2 proximal to the liquid crystal. These electrodes are placed for the control of the liquid crystal in this area.

The color filtering layer 6 possesses various areas 6R, 6G, 6B each of a different material, which allow light of only a certain color to pass through, advantageously, light of the respective colors red, green and blue. Similarly, each area 6R, 6G or 6B of the color filtering layer 6 possesses an opening 5a, which is so placed on the third plate 7, that it completely covers over the opening 5a in the line of vision of the liquid crystal display.

Between the second plate 2 and the third plate 7, spacers 9 have been inserted. Between the second plate 2 and the third plate 7 a film 10 for the improvement of the optical characteristics has been inserted.

Behind the third plate 7 is placed an at least partially reflecting (transreflective) layer 12 (transflector), which at least partially reflects the incident light in the view line of the liquid crystal display.

An LCD-cell in accord with a second advantageous embodiment of the present invention is presented in FIG. 2 and essentially resembles the first embodiment. In differing from the first embodiment, in this case, the color filtering layer 6 is placed on a surface 7b of the third plate 7 which surface 7b is remote from the liquid crystal 4, while the opaque layer 5 is made of a light blocking, preferably opaque material, which possesses openings 5a and is placed on one of these other surfaces 7a of the third plate 7 lying opposite to surface 7b of the third plate 7.

The openings 5a of the opaque layer 5 are again so dimensioned and located, that they delimit respectively the components of a particular shape.

The color filtering layer 6 possesses various areas 6R, 6G, 6B, each of different material, which respectively allow light of a certain color to pass, preferably the colors red, green and blue. For this function, each area 6R, 6G and 6B of the color filtering layer 6, possesses respectively a surface, which is slightly larger than the surface of an opening 5a, and is so placed on the third plate 7, that these cover openings 5a in the vision line of the liquid crystal display completely.

Between the second plate 2 and the third plate 7, spacers 9 have been inserted.

Behind the third plate 7 is placed an illumination source 11, which can radiate light into the vision line of the liquid crystal element. Between third plate 7 and source of illumination 11, once again a partially transparent (transmissive) and partially reflecting (transreflecting) layer 12 is placed (not shown).

For the illumination of the LCD display, there exist, principally, three available possibilities: first, incident light falling from the front is partially reflected by a transflective layer 12, which is behind the LCD-display; second, the LCD display is radiated by the illumination source 11 from the back; and third, these two variants are combined, in that a partially transmissive, partially transflective layer 12 (transflector), which is between the third plate 7 and the illumination source, at least partially reflects the incident light from the surroundings, and at least partially allows passage of the radiated light from the illumination source 11 in the direction to the LCD-display. In this way, as an example, the degree of brightness of the display can be adjusted.

It will be apparent to those skilled in the art that various modifications and variations can be made in the present invention without departing from the scope and spirit of the invention. For example, specific shapes of various elements of the illustrated embodiments may be altered to suit particular applications. It is intended that the present invention include such modifications and variations as come within the scope of the appended claims and their equivalents.

What is claimed is:

1. A liquid crystal display comprising:
   a first transparent plate;
   a second transparent plate disposed substantially parallel to the first transparent plate;
   a liquid crystal interposed between the first and second transparent plates;
   a sealing apparatus attachable to the first and second transparent plates and configured to seal the liquid crystal there between;
   an opaque layer having a plurality of openings therein;
   at least one color filtering layer configured to selectively pass light therethrough, the opaque layer and the at least one color filtering layer disposed substantially parallel to each other proximate the first and second transparent plates and spaced apart from the liquid crystal; and
   a third transparent plate disposed substantially parallel to the second transparent plate and defining a first surface and a second surface, the second transparent plate defining an additional surface remote from the liquid crystal, wherein the opaque layer is disposed on one of the first and second surfaces, the at least one color filtering layer disposed on the other of the first and second surfaces.

2. The liquid crystal display of claim 1, wherein the second transparent plate is interposed between the first and third transparent plates.

3. The liquid crystal display of claim 1, wherein the plurality of openings of the opaque layer are configured to delimit an image element to a specific form.

4. The liquid crystal display of claim 1, wherein the opaque layer is configured to block light.

5. A The liquid crystal display of claim 1, wherein the at least one color filtering layer exhibits respective areas configured to selectively permit passage of a primary color.

6. The liquid crystal display of claim 5, wherein the primary color is selected from the group consisting of red, blue, green and combinations thereof.

7. The liquid crystal display of claim 5, wherein the plurality of openings of the opaque layer are interposed between the liquid crystal and the respective areas of the at least one color filtering layer.

8. The liquid crystal display of claim 1, further comprising a spacer insertable between the second and third transparent plates.

9. The liquid crystal display of claim 1, further comprising a film disposed proximate the second transparent plate, the film configured to improve optical characteristics of the liquid crystal display.

10. The liquid crystal display of claim 1, further comprising an illumination source disposed proximate one of the second and third transparent plates and configured to radiate light in a direction of the liquid crystal display.

11. The liquid crystal display of claim 1, further comprising an at least partially reflecting layer disposed proximate one of the second and third transparent plates and configured to at least partially reflect an incident light in a direction of the liquid crystal display.

12. A liquid crystal display having a first transparent plate; a second transparent plate disposed substantially parallel to the first transparent plate; a liquid crystal interposed between the first and second transparent plates; a sealing apparatus configured to seal the liquid crystal between the first and second transparent plates; and an opaque layer having an opening therein, the liquid crystal display including:
   at least one color filtering layer, the opaque layer and the at least one color filtering layer spaced apart from the liquid crystal, the at least one color filtering layer and the opaque layer cooperable to selectively block and pass light therethrough and disposed substantially parallel to each other proximate the first and second transparent plates; and
   a third transparent plate disposed substantially parallel to the second transparent plate and defining a first surface and a second surface, the second transparent plate defining an additional surface remote from the liquid crystal, wherein one of the at least one color filtering layer and the opaque layer is disposed on one of the first and second surfaces, the other of the at least one color filtering layer and the opaque layer disposed on the other of the first and second surfaces, the at least one color filtering layer exhibiting a respective area configured to selectively permit passage of a primary color, the opening of the opaque layer and the respective area of the at least one color filtering layer offset from each other.

13. The liquid crystal display of claim 12, wherein the plurality of openings of the opaque layer are configured to delimit an image element to a specific form.

14. The liquid crystal display of claim 12, wherein the opaque layer is configured to block light.

15. A liquid crystal display comprising:
   a first transparent plate;
   a second transparent plate disposed substantially parallel to the first transparent plate;
   a liquid crystal interposed between the first and second transparent plates;
   a sealing apparatus attachable to the first and second transparent plates and configured to seal the liquid crystal there between;
   an opaque layer having a plurality of openings therein;
   at least one color filtering layer configured to selectively pass light therethrough, the opaque layer and the at least one color filtering layer disposed substantially parallel to each other proximate the first and second transparent plates and spaced apart from the liquid crystal; and
   a third transparent plate disposed substantially parallel to the second transparent plate and defining a first surface and a second surface, the second transparent plate defining an additional surface remote from the liquid crystal, wherein the opaque layer is disposed on the additional surface of the second transparent plate remote from the liquid crystal, the at least one color filtering layer disposed on one of the first and second surfaces of the third transparent plate.

16. The liquid crystal display of claim 15, wherein the second transparent plate is interposed between the first and third transparent plates.

17. The liquid crystal display of claim 15, wherein the plurality of openings of the opaque layer are configured to delimit an image element to a specific form.

18. The liquid crystal display of claim 15, wherein the opaque layer is configured to block light.

19. The liquid crystal display of claim 15, wherein the at least one color filtering layer exhibits respective areas configured to selectively permit passage of a primary color to allow some light to pass.

20. The liquid crystal display of claim 15, wherein the at least one color filtering layer exhibits respective areas configured to selectively permit passage of a primary color.

21. The liquid crystal display of claim 20, wherein the primary color is selected from the group consisting of red, blue, green and combinations thereof.

22. The liquid crystal display of claim 20, wherein the plurality of openings of the opaque layer are interposed between the liquid crystal and the respective areas of the at least one color filtering layer.

23. The liquid crystal display of claim 15, further comprising a spacer insertable between the second and third transparent plates.

24. The liquid crystal display of claim 15, further comprising a film disposed proximate the second transparent plate, the film configured to improve optical characteristics of the liquid crystal display.

25. The liquid crystal display of claim 15, further comprising an illumination source disposed proximate one of the second and third transparent plates and configured to radiate light in a direction of the liquid crystal display.

26. The liquid crystal display of claim 15, further comprising an at least partially reflecting layer disposed proximate one of the second and third transparent plates and configured to at least partially reflect an incident light in a direction of the liquid crystal display.

* * * * *